May 21, 1940.  A. PECKHAM  2,201,787
ADJUSTABLE BRACKET
Filed June 29, 1939
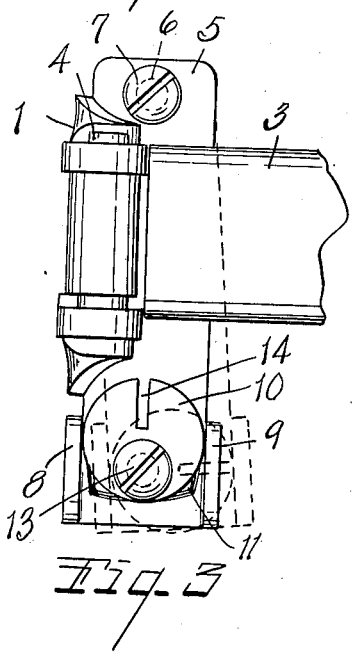
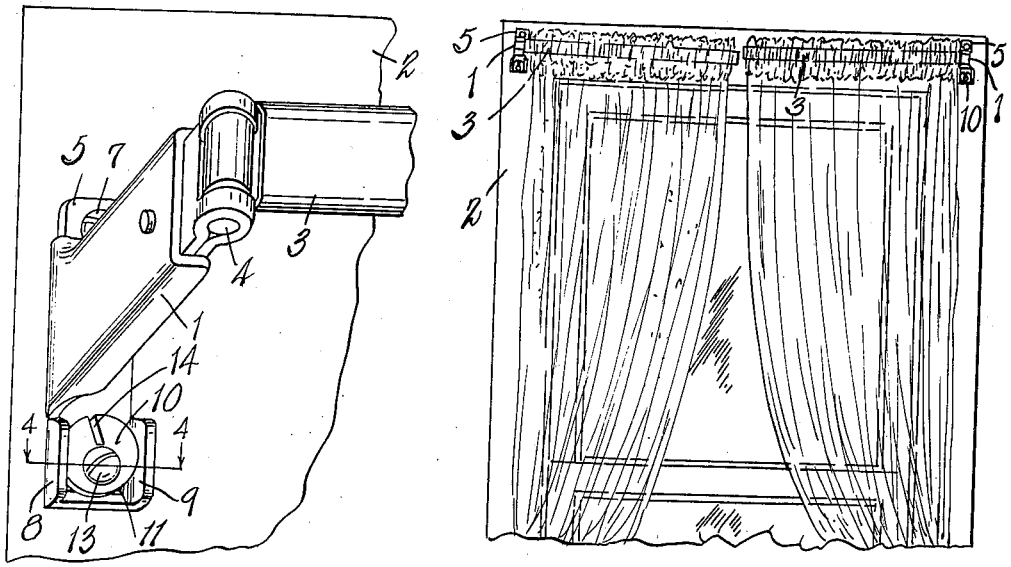
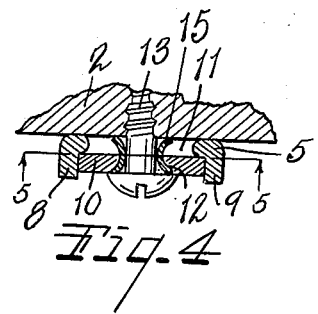
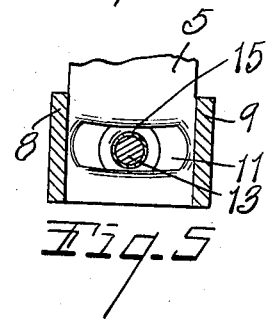
INVENTOR.
Alfred Peckham
BY Earl & Chappell
ATTORNEYS.

Patented May 21, 1940

2,201,787

UNITED STATES PATENT OFFICE 2,201,787

ADJUSTABLE BRACKET

Alfred Peckham, Sturgis, Mich., assignor to Kirsch Company, Sturgis, Mich.

Application June 29, 1939, Serial No. 281,932

7 Claims. (Cl. 156—19)

This invention relates to improvements in adjustable brackets.

This invention relates to brackets for use with swinging curtain rods or the like. Such curtain rods which may either have a swinging rod or a rod supported from one end only offer difficulties of installation in that it is difficult to level the rods, particularly when the weight of the drapes or curtains is imposed upon the rods, and it may be that rods which are installed level will sag when the curtains or drapes are placed on the rod.

The objects of this invention are:

First, to provide a new and improved bracket for use with such curtain rods.

Second, to provide such a bracket which is easily adjusted and with which it is possible to adjust the rod with a common screw driver and in such a manner that the one adjusting the rod may position himself so as to check the adjustment as it is made.

Third, to provide such a bracket which may be easily and inexpensively made.

Fourth, to provide such a bracket which is unitary in its nature.

Further objects and advantages pertaining to details and economies of construction and operation will appear in the description to follow. A preferred embodiment of my invention is illustrated in the accompanying drawing, in which:

Fig. 1 is a view of a window with curtain rods of the type described thereon, showing how the rods may sag and how with my invention they may be adjusted.

Fig. 2 is a perspective view of my improved bracket in place on a window frame.

Fig. 3 is a front view of my improved bracket showing how adjustments can be made.

Fig. 4 is a detail sectional view taken on line 4—4 of Fig. 2.

Fig. 5 is a detail sectional view taken on the line 5—5 of Fig. 4.

In Fig. 2, I show my improved bracket 1 fastened on a wall or window casing 2. A rod 3 is fastened on pivot 4 on the bracket 1. The base 5 of the bracket which is of sheet metal is provided with a hole 6 to pivotally receive an attaching screw 7. The lower portion of the sheet metal base 5 is provided with ears 8 and 9 which are merely bent up from the plane of the base of the bracket and form cam followers for a circular cam 10 which lies between and engages the ears 8 and 9.

In the bracket between the ears 8 and 9 is a substantially vertical slot 11 which may be formed on an arc whose radius centers in the hole 6 of the bracket. The cam 10 is provided with an eccentrically located hole 12 through which an attaching screw 13 extends. In the side of the cam 10, I provide a slot 14 to receive a common screw driver by means of which the cam 10 may be rotated about the screw 13 as an axis. I prefer to extend the slot substantially radially from the hole 12 or the screw 13.

In order to make a unitary structure, I make the slot 11 and the hole 12 slightly larger than the screw 13 and provide an eyelet 15 which extends through the slot 11 and the hole 12 and is riveted over at its ends to hold the cam in position on the bracket. The eyelet 15 is movable back and forth in the slot 11.

To install my improved bracket, I fasten the upper end of the bracket in position with the screw 7. The bracket is roughly leveled and with the cam in substantially the position shown in full lines in Fig. 3, I insert the screw 13 into the wall or window casing and tighten it sufficiently to at least momentarily hold the bracket in any desired adjusted position. It may be that it will not be necessary to tighten the screw 13 since if the screw 7 is tightened sufficiently frictional engagement between bracket 5 and the wall may suffice to momentarily hold the bracket in adjusted position.

The bracket is then adjusted by inserting the screw driver in the slot 14. The one adjusting the bracket may position himself out in front of the window and may, by turning the screw driver, adjust the bracket to the right as shown in dotted lines in Fig. 3 or to the left. The curtains or draperies may be in place on the rod 3 and the adjustment may be accomplished to compensate for the weight of the curtain or draperies.

In Fig. 1, I show a window with my improved rods in position and it will be noted that the left rod is not level but extends below the level of the right rod. One adjusting the bracket may position himself out in front and turn the cam 10 with a screw driver so as to raise and level the rod. After this is done, the screw 13 is tightened and if desired the screw 7 may be further tightened so as to hold the bracket and the curtain and rods in adjusted position.

It will be apparent that my improved bracket can be made easily and simply by metal forming processes and that the finished product will be inexpensive. The bracket and its adjusting means are unitary in nature, being held together as above described. It will be apparent that modifications of the structure can be made without departing from my invention and I do not wish to be limited to the specific form of invention shown. I have defined the invention in the claims.

Having thus described my invention, what I claim as new and desire to secure by Letters Patent is:

1. A bracket for swinging curtain rods or the like comprising a sheet metal base having a hole therein to receive an attaching screw or the like, and a pair of ears bent upwardly from the base to form a cam receiving recess extending along a line in a direction substantially radially of said hole, a cam fitted between said ears and having an eccentrically disposed hole to receive an attaching screw or the like, said base having a slot extending between said ears and in register with said eccentrically disposed hole of said cam to permit pivoting of said base about the hole in said base as an axis, an eyelet extending through said eccentrically disposed hole of said cam and said slot to retain said cam in position, and a slot in the side of said cam to receive a screw driver to rotate said cam.

2. A bracket for swinging curtain rods or the like comprising a base having a hole therein to receive an attaching screw or the like, and a pair of ears extending from the base to form a cam receiving recess extending along a line in a direction substantially radially of said hole, a cam fitted between said ears and having an eccentrically disposed hole to receive an attaching screw or the like, said base having a slot extending between said ears and in register with said eccentrically disposed hole of said cam to permit pivoting of said base about the hole in said base as an axis, an eyelet extending through said eccentrically disposed hole of said cam and said slot to retain said cam in position, and a slot in the side of said cam to receive a screw driver to rotate said cam.

3. A bracket for swinging curtain rods or the like comprising a sheet metal base having a hole therein to receive an attaching screw or the like, and a pair of ears bent upwardly from the base to form a cam receiving recess extending along a line in a direction substantially radially of said hole, a cam fitted between said ears and having an eccentrically disposed hole to receive an attaching screw or the like, said base having a slot extending between said ears and in register with said eccentrically disposed hole of said cam to permit pivoting of said base about the hole in said base as an axis, an eyelet extending through said eccentrically disposed hole of said cam and said slot to retain said cam in position, and means on said cam engageable to rotate said cam.

4. A bracket for swinging curtain rods or the like comprising a base having a hole therein to receive an attaching screw or the like, and a pair of ears extending from the base to form a cam receiving recess extending along a line substantially radially of said hole, a cam fitted between said ears and having an eccentrically disposed hole to receive an attaching screw or the like, said base having a slot extending between said ears and in register with said eccentrically disposed hole of said cam to permit pivoting of said base about the hole in said base as an axis, an eyelet extending through said eccentrically disposed hole of said cam and said slot to retain said cam in position, and means on said cam engageable to rotate said cam.

5. A bracket for swinging curtain rods or the like comprising a base having a hole therein to receive an attaching screw or the like, and a pair of ears extending from the base to form a cam receiving recess extending along a line in a direction substantially radially of said hole, a cam fitted between said ears and having an eccentrically disposed hole to receive an attaching screw or the like, said base having a slot extending between said ears and in register with said eccentrically disposed hole of said cam to permit pivoting of said base about the hole in said base as an axis, and a slot in the side of said cam to receive a screw driver to rotate said cam.

6. A bracket for swinging curtain rods or the like comprising a base having a hole therein to receive an attaching screw or the like, and a pair of ears extending from the base to form a cam receiving recess extending along a line in a direction substantially radially of said hole, a cam fitted between said ears and having an eccentrically disposed hole to receive an attaching screw or the like, said base having a slot extending between said ears and in register with said eccentrically disposed hole of said cam to permit pivoting of said base about the hole in said base as an axis, and means on said cam engageable to rotate said cam.

7. A bracket for swinging curtain rods or the like comprising a base having a hole therein to receive an attaching screw or the like, and a pair of ears extending from the base to form a cam receiving recess extending along a line in a direction substantially radially of said hole, and a cam fitted between said ears and having an eccentrically disposed hole to receive an attaching screw or the like, said base having a slot extending between said ears and in register with said eccentrically disposed hole of said cam.

ALFRED PECKHAM.